(12) United States Patent
Neff et al.

(10) Patent No.: US 7,208,531 B2
(45) Date of Patent: Apr. 24, 2007

(54) VISCOELASTIC POLYURETHANE FOAM

(75) Inventors: Raymond A. Neff, Northville, MI (US); Suzanne Dakin, Grosse Pointe Farms, MI (US)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 10/916,241

(22) Filed: Aug. 11, 2004

(65) Prior Publication Data

US 2005/0038133 A1 Feb. 17, 2005

Related U.S. Application Data

(63) Continuation-in-part of application No. 10/606,825, filed on Jun. 26, 2003, and a continuation-in-part of application No. 10/607,555, filed on Jun. 26, 2003.

(51) Int. Cl.
*C08G 18/28* (2006.01)

(52) U.S. Cl. ...................... 521/174; 521/159

(58) Field of Classification Search ............... 521/174, 521/159
See application file for complete search history.

(56) References Cited

U.S. PATENT DOCUMENTS

| | | | |
|---|---|---|---|
| 3,405,077 A | 10/1968 | Pastor et al. | |
| 3,454,504 A | 7/1969 | Murai et al. | |
| 3,875,086 A | 4/1975 | Ramey et al. | |
| 4,129,697 A | 12/1978 | Schapel et al. | |
| 4,209,593 A | 6/1980 | Khanna | |
| 4,367,259 A | 1/1983 | Fulmer et al. | |
| 4,670,477 A | 6/1987 | Kelly et al. | |
| 4,950,695 A | 8/1990 | Stone | |
| 4,981,880 A | 1/1991 | Lehmann et al. | |
| 4,987,156 A | 1/1991 | Tozune et al. | |
| 5,420,170 A * | 5/1995 | Lutter et al. ................. | 521/159 |
| 5,521,226 A * | 5/1996 | Bleys ......................... | 521/174 |
| 5,631,319 A | 5/1997 | Reese et al. | |
| 5,710,192 A | 1/1998 | Hernandez | |
| 5,919,395 A | 7/1999 | Bastin et al. | |
| 5,968,993 A | 10/1999 | Bleys | |
| 6,136,879 A * | 10/2000 | Nishida et al. .............. | 521/174 |
| 6,204,300 B1 | 3/2001 | Kageoka et al. | |
| 6,391,935 B1 * | 5/2002 | Hager et al. ................ | 521/170 |
| 6,495,611 B1 | 12/2002 | Arlt et al. | |
| 6,710,096 B2 * | 3/2004 | Neff et al. ................... | 521/174 |

FOREIGN PATENT DOCUMENTS

| | | |
|---|---|---|
| EP | 0 778 301 A1 | 6/1997 |
| EP | 1 125 958 A1 | 8/2001 |
| EP | 1 178 061 A1 | 2/2002 |
| EP | 0 934 962 B1 | 6/2002 |
| WO | WO 01/25305 A1 | 4/2001 |
| WO | WO 01/32736 A1 | 5/2001 |

OTHER PUBLICATIONS

"NIAX Processing Additive DP-1022", Crompton Osi Specialties, pp. 1-6; Website:www.cromptoncorp.com, Jun. 2003.
"Novel MDI-Based Slabstock Foam Technology", pp. 63-68, Polyurethanes World Congress '97, Sep. 29-Oct. 1, 1997.
PCT International Search Report, PCT/EP2004/005460, 2004.

* cited by examiner

*Primary Examiner*—John M. Cooney, Jr.
(74) *Attorney, Agent, or Firm*—Fernando A. Borrego

(57) ABSTRACT

The subject invention provides a viscoelastic polyurethane foam having a density of from one to twenty pounds per cubic foot. The foam is formed from a composition that is a reaction product of an isocyanate component (A), a first polyether polyol (B), a second polyether polyol (C), and a chain extender (D). The chain extender (D) has a backbone chain with from two to eight carbon atoms and has a weight-average molecular weight of less than 1,000 and is present in an amount of from 5 to 50 parts by weight based on 100 parts by weight of the composition. The viscoelastic polyurethane foam a first glass transition temperature greater than zero and a second glass transition temperature less than zero and having a tan delta peak ratio of the first glass transition temperature to the second glass transition temperature less than 2.2.

37 Claims, 6 Drawing Sheets

VISCOELASTIC POLYURETHANE FOAM

CROSS-REFERENCES TO RELATED APPLICATIONS

This application is a continuation-in-part of U.S. patent application Ser. Nos. 10/606,825 and 10/607,555, both filed Jun. 26, 2003.

BACKGROUND OF THE INVENTION

1. Field of the Invention

The subject invention relates to a viscoelastic polyurethane foam having a density of from one to twenty pounds per cubic foot. More specifically, the subject invention relates to the viscoelastic polyurethane foam being formed of a composition having a chain extender that improves physical properties and viscoelasticity of the foam.

2. Description of the Related Art

Various related art viscoelastic foams are a reaction product of an isocyanate component and an isocyanate-reactive component reactive with the isocyanate component. These related art foams are illustrated in U.S. Pat. No. 6,204,300; European Patent Application No. 1,178,061; and PCT Publication WO 01/32736.

Viscoelastic polyurethane foam is currently a niche application in the United States. It is used mainly in home and office furnishings, although a considerable amount of work has been conducted for automotive applications. Certain automotive applications subject the viscoelastic foam to a wide range of temperatures, especially in areas that have very cold seasons and very hot seasons. Therefore, the foam has to be able to perform satisfactorily at both the colder and warmer temperatures. The market for viscoelastic foam in home furnishing applications is currently estimated at about 25 million lbs./yr. in the United States. While the market size is now relatively small, it is growing at an estimated rate of about 20% to 30% per year.

Viscoelastic foam exhibits slow recovery, and thus high hysteresis, during a compression cycle. They also typically have low ball rebound values. These properties may result from either low airflow, as the recovery is limited by the rate of air re-entering the foam, or by the inherent properties of the foamed polymer. Polymer viscoelasticity is usually temperature-sensitive, and is maximized when the polymer undergoes a glass transition. For the viscoelastic foams currently studied, this glass transition results from vitrification of the polyether soft segment phase. By manipulating the structure and composition of the soft segment phase so that the glass transition temperature approximately coincides with a "use temperature" of the material, the viscoelastic nature of the material is maximized. When this material is used in a mattress or as a seat cushion, body heat from the user warms a portion of the material, thus softening it. The result is that the cushion molds to the shape of the body part in contact with it, creating a more uniform pressure distribution, which increases comfort. In addition, the remainder of the material remains hard, providing support. Thus, the temperature sensitivity increases the effective support factor of the material, allowing the construction of a mattress without metal springs.

The type of isocyanate component and the functionality and hydroxyl value of the isocyanate-reactive component are selected and formulated such that the glass transition occurs at a temperature at which the foam is used. While most of the physical properties of viscoelastic foams resemble those of conventional foams, the resilience of viscoelastic foams is much lower, generally less than about 15%. Suitable applications for viscoelastic foam take advantage of its shape conforming, energy attenuating, and sound damping characteristics. One way to achieve these characteristics is to modify the amount and type of isocyanate-reactive components, isocyanate components, surfactants, catalysts, fillers, or other components, to arrive at foams having low resilience, good softness, and the right processing characteristics. Too often, however, the window for processing these formulations is undesirably narrow. These approaches are shown in U.S. Pat. Nos. 6,495,611; 5,420, 170; and 4,367,259. Other related art foams are shown in U.S. Pat. Nos. 4,334,031; 4,374,935; and 4,568,702; PCT Publication WO 01/25305; European Patent No. 0934962; and European Patent Application No. 1125958 and 0778301. However, none of these related art patents discloses or suggests the unique and novel polyurethane viscoelastic foam of the subject invention.

Other approaches to making viscoelastic foam hinge on finding the right mixture of polyether polyols and other components. For example, U.S. Pat. No. 4,987,156 arrives at a soft, low-resilience foam with a mixture of high and low molecular weight polyols, each of which has a functionality of at least 2, and a plasticizer having a solidification point less than –20 degrees C. However, the '156 patent does not disclose a viscoelastic foam and requires that the polyol and the isocyanate be reacted in the presence of the plasticizer. U.S. Pat. No. 5,420,170 teaches use of a mixture that includes one polyol having a functionality of 2.3–2.8 and another polyol having a functionality of 2–3. U.S. Pat. No. 5,919,395 takes a similar approach with a polyol mixture that contains a 2200 to 6200 weight-average molecular weight polyol having a functionality of 2.5 to 6 and a rigid polyol having molecular weight 300 to 1000 and a functionality of 2.5 to 6. Neither the '170 patent nor the '395 patent disclose adding a chain extender to the composition to modify the glass transition temperature of the foams.

Another related art composition is disclosed in a paper titled "Novel MDI-Based Slabstock Foam Technology" by Lutter and Mente. The composition disclosed produces a viscoelastic foam from an isocyanate-terminated prepolymer, a first polyol, and an ethylene-oxide rich polyol. However, the paper does not disclose a chain extender present in significant amounts to produce the viscoelastic foam having improved properties.

The related art foams described above are characterized by one or more inadequacy. Accordingly, it would be advantageous to provide a viscoelastic polyurethane foam that overcomes these inadequacies.

BRIEF SUMMARY OF THE INVENTION AND ADVANTAGES

The subject invention provides a viscoelastic polyurethane foam having a density of from one to twenty pounds per cubic foot. The foam is formed from a composition that is a reaction product of an isocyanate component (A), a first polyether polyol (B), a second polyether polyol (C), and a chain extender (D). The first polyether polyol (B) has (i) a hydroxyl number of from 20 to 60 mg KOH/g, (ii) a plurality of internal blocks formed from oxyalkylene monomers comprising a random heteric mixture of ethylene oxide and propylene oxide, and (iii) a plurality of terminal caps attached to the plurality of internal blocks. The internal blocks have at most 20% by weight ethylene oxide based on a total weight of the oxyalkylene monomers in the internal blocks and the terminal caps comprise at most 25% by weight ethylene oxide based on a total weight of the first polyether polyol.

The second polyether polyol (C) has (i) a hydroxyl number of from 20 to 200 mg KOH/g, (ii) a plurality of internal blocks formed from oxyalkylene monomers, and (iii) a plurality of terminal caps attached to the plurality of internal blocks. The second polyether polyol comprises at least 50% by weight ethylene oxide based on the total weight of the second polyether polyol. The chain extender (D) has (i) a backbone chain with from two to eight carbon atoms, and (ii) a weight-average molecular weight of less than 1,000.

The subject invention produces the foam having a first glass transition temperature greater than zero and a second glass transition temperature less than zero and having a tan delta peak ratio of the first glass transition temperature to the second glass transition temperature less than 2.2.

Accordingly, the subject invention provides the viscoelastic polyurethane foam having greater flexibility in producing the foam with a desired glass transition temperature that is closer to a use temperature of the foam. More specifically, the foam has two glass transitions which broadens the use temperature range. The foam is particularly suited for automotive seat applications because of the broader use temperature range resulting from the two glass transitions. The ratio of the tan delta peaks indicates the foam's ability to perform satisfactorily at in the temperature range of −15 to +50° C. The ratio can be adjusted by varying the amounts of the first (B) and the second (C) polyether polyols and the amount of the chain extender. Further, the foam produced with the composition having the chain extender (D) also has improved physical properties while maintaining viscoelasticity of the foam. Therefore, the subject invention overcomes the inadequacies that characterize the related art.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
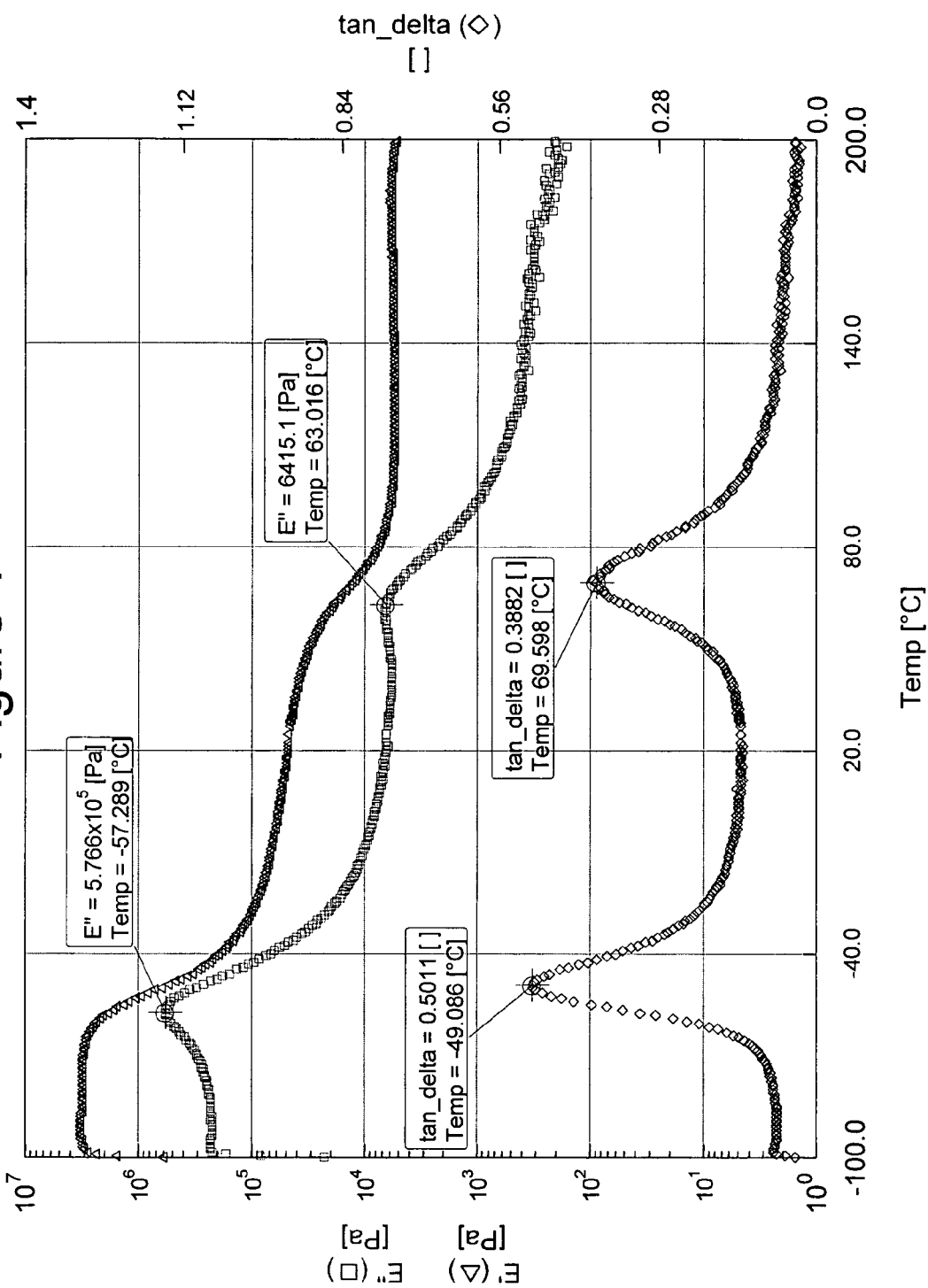
FIG. 1 is a graphical representation illustrating the dynamic mechanical thermal analysis (DMTA) profile for the viscoelastic polyurethane foam prepared according to Example 1.

The subject invention provides a viscoelastic polyurethane foam having a density of from one to twenty pounds per cubic foot (pcf). Preferably, the viscoelastic polyurethane foam has a density of from 1.8 to 10 pcf, and more preferably from 2 to 6 pcf. Various properties are measured to determine whether the foam is viscoelastic. One property is a glass transition temperature (Tg) of the foam. The Tg is determined through a dynamic mechanical thermal analysis (DMTA). Viscoelastic foams typically have one Tg around or above zero degrees Celsius. The viscoelastic foams of the subject invention have two glass transition temperatures; a first Tg above zero degrees Celsius and a second Tg below zero degrees Celsius. The first Tg is typically about 5 to 75° C., preferably 15 to 70° C., and more preferably 25 to 50° C. The second Tg is typically about −20 to −80° C., preferably −40 to −60° C., and more preferably −46 to −57° C.

The first Tg and the second Tg make the foam of the subject invention particularly useful for automotive or non-automotive, e.g. snowmobile, RTV and motorcycles, seating applications, as well as for sporting equipment that is subjected to cold temperatures, such as hockey or football. Most automobiles are subjected to varying temperatures, especially in areas that have cold seasons and warm seasons. One preferred automotive seating application utilizes a thin (0.5–2 cm) layer of viscoelastic foam either molded or slabstock and a molded high resilience foam underneath. Other seating foam applications include co-molding with the high resilience foam layer where the viscoelastic foam can be sprayed or poured. The layer of viscoelastic foam enhances the feel and the pressure relieving capability of the automotive seat.

The performance specifically requires the foam to remain flexible up to −20° C. and still have adequate other standard properties for the desired application. Prior viscoelastic foams generally freeze at temperatures below 0° C. which makes them unacceptable for applications that are subjected to colder temperatures.

The DMTA also produces a peak tan delta, or tan delta peak, which occurs at the Tg. The tan delta is related to the ability of the foam to dissipate energy during a compression cycle and is related to a recovery time of the foam. The Tg and tan delta peak indicate the vitrification of a soft segment phase of the foam. Vitrification manipulates the structure and composition of the soft segment phase so that the Tg approximately coincides with a use temperature of the foam, thereby maximizing the viscoelastic nature of the foam. The foam has a tan delta peak at each of the first Tg and the second Tg. For example, the foam may have the first Tg of 57.2° C. and the peak tan delta at the first Tg is 0.559 and the second Tg of −52° C. and the peak tan delta at the second Tg is 0.3363. The ratio of the peak tan delta would then be 0.559/0.3363, which is 1.66. The ratio of the peak tan delta is an indicator of the foams ability to function well at both the first Tg and the second Tg. It is desirable to have a tan delta peak ratio of the first Tg to the second Tg less than 2.2.

Additional physical properties that are advantageous, but not specifically related to the viscoelastic properties, include density, hardness, and recovery characteristics. A foam that has poor recovery characteristics will result in fingerprinting, i.e., fingerprints remain in the foam for long periods of time, such as greater than one minute, after handling. Also, the foam formed from the subject invention should have a surface that is not tacky and that does not have any oily residue detectable to the touch.

The foam of the subject invention is a reaction product of an isocyanate component (A), a first polyether polyol (B), a second polyether polyol (C), and a chain extender (D). References herein below to amounts of these components may be to either the foam or the composition, since mass must be balanced throughout the reaction as is understood by those skilled in the art. In other words, the foam is the reaction product of the components, while the composition refers to the individual components.

The isocyanate component (A) is preferably substantially free of toluene diisocyanate. It is to be appreciated that substantially free of toluene diisocyanate means less than 8 parts by weight based on 100 parts by weight of the isocyanate component (A) and preferably less than 5 parts by weight based on 100 parts by weight of the isocyanate component (A). More preferably, the isocyanate component (A) is completely free of toluene diisocyanate, i.e., 0 parts by weight based on 100 parts by weight of the isocyanate component (A).

However, it is to be understood that the foam may include a minimal amount of toluene diisocyanate, without effecting the viscoelastic performance characteristics of the polyurethane foam. An isocyanate index, as is known in the art, is the ratio of NCO groups in the isocyanate component (A) to the OH groups in the first (B) and the second (C) polyether polyols. The isocyanate index is from 75 to 110, preferably from 80 to 105, and most preferably from 80 to 90. One skilled in the art would appreciate that the amount of isocyanate component (A) can be determined by the isocyanate index in combination with the amount of first and the second polyether polyols present.

The isocyanate component (A) is selected from at least one of pure diphenylmethane diisocyanate (MDI) and polymeric diphenylmethane diisocyanate (PMDI). It is to be appreciated that the isocyanate component (A) may include a mixture of pure diphenylmethane diisocyanate and polymeric diphenylmethane diisocyanate. Pure diphenylmethane diisocyanate is understood by those skilled in the art to include diphenylmethane-2,4'-diisocyanate and diphenylmethane-4,4'-diisocyanate. Polymeric diphenylmethane diisocyanate is understood by those skilled in the art to include polycyclic polyisocyanates having 3-ring compounds, 4-ring compounds, 5-ring compounds, and higher homologs. In one embodiment, the pure diphenylmethane diisocyanate is present in an amount of from 50 to 99 parts by weight based on 100 parts by weight of the isocyanate component (A) and the polymeric diphenylmethane diisocyanate is present in an amount from 1 to 50 parts by weight based on 100 parts by weight of the isocyanate component (A). The pure diphenylmethane diisocyanate includes the diphenylmethane-2,4'-diisocyanate present in an amount of from 1 to 45 parts by weight based on 100 parts by weight of the pure diphenylmethane diisocyanate and the diphenylmethane-4,4'-diisocyanate present in an amount from 55 to 99 parts by weight based on 100 parts by weight of the pure diphenylmethane diisocyanate. Examples of suitable isocyanates include, but are not limited to, LUPRANATE® MS, LUPRANATE® M20S, LUPRANATE® MI, and LUPRANATE® M10 LUPRANATE® M70 and LUPRANATE® M200 isocyanates, and No. 236 isocyanate, No. 233 isocyanate and No. 278 isocyanate, which are commercially available from BASF Corporation.

In another embodiment, the isocyanate component (A) may include an isocyanate-terminated prepolymer. The prepolymer is a reaction product of an isocyanate and a prepolymer polyol. The prepolymer polyol has a weight-average molecular weight greater than 1,000 and is present in an amount of from 1 to 20 parts by weight based on 100 parts by weight of the isocyanate component (A). The prepolymer polyol may be selected from at least one a polyester polyol, a polyether polyol, or a polyamine polyol. The prepolymer polyol may be formed from an initiator selected from at least one of ethylene glycol, diethylene glycol, propylene glycol, dipropylene glycol, butane diol, glycerol, trimethylolpropane, triethanolamine, pentaerythritol and sorbitol. Examples of polyamine polyols may be selected from, but not limited to, ethylene diamine, toluene diamine, diaminodiphenylmethane and polymethylene polyphenylene polyamines, and aminoalcohols. Examples of aminoalcohols include ethanolamine and diethanolamine, triethanolamine, and mixtures thereof. Examples of suitable prepolymer polyols include, but are not limited to, PLURACOL® 2100, PLURACOL® 593, PLURACOL® 945, PLURACOL® 1509, PLURACOL® 1051, PLURACOL® 1385, PLURACOL® 381, PLURACOL® 726, PLURACOL® 718, PLURACOL® 1718, PLURACOL® 1442, and PLURACOL® 1117, which are commercially available from BASF Corporation.

The first polyether polyol has (i) a hydroxyl number of from 20 to 60 mg KOH/g. Preferably the hydroxyl number is from 20 to 40 mg KOH/g and more preferably from 20 to 30 mg KOH/g. The first polyether polyol also has (ii) a plurality of internal blocks formed from oxyalkylene monomers comprising a random heteric mixture of ethylene oxide (EO) and propylene oxide (PO) and (iii) a plurality of terminal caps attached to the plurality of internal blocks. The internal blocks have at most 20% by weight EO based on a total weight of the oxyalkylene monomers in the internal blocks and more preferably at most 13% by weight EO based on the total weight of the oxyalkylene monomers in the internal blocks. The terminal caps comprise at most 25% by weight EO based on a total weight of the first polyether polyol, and preferably at most 20% by weight EO based on the total weight of the first polyether polyol (B). The first polyether polyol may have no EO, if the first polyether polyol was an all PO polyol. Examples of suitable first polyether polyols include, but are not limited to, PLURACOL® 2100, PLURACOL® 380, PLURACOL® 2115, PLURACOL® 2120, and PLURACOL® 2130, PLURACOL® 2145, PLURACOL® 945, PLURACOL® 1509, PLURACOL® 1051, PLURACOL® 1385, PLURACOL® 1538, PLURACOL® 381, PLURACOL® 726, PLURACOL® 220, PLURACOL® 718, PLURACOL® 1718, PLURACOL® 1442, PLURACOL® 1117, and PLURACOL® 1135, which are commercially available from BASF Corporation.

The second polyether polyol is an EO-rich polyol and has (i) a hydroxyl number of from 20 to 200 mg KOH/g. The second polyether polyol also has (ii) a plurality of internal blocks formed from oxyalkylene monomers and (iii) a plurality of terminal caps attached to the plurality of internal blocks. In order to be EO-rich, the second polyether polyol should have (iv) at least 50% by weight EO, and preferably at least 60% by weight EO, based on the total weight of the second polyether polyol. The weight of the EO may be based on either the amount of EO in the terminal caps of the second polyether polyol or the amount of EO in the plurality of internal blocks or a combination of both. If the EO is present in the terminal caps, then the terminal caps should comprise at least 30% by weight EO based on the total weight of the second polyether polyol (C). Examples of suitable second polyether polyols include, but are not limited to, PLURA- COL® 593 and PLURACOL® 1123, which are commercially available from BASF Corporation.

The polyether polyols may be formed with an initiator, as is known in the art, and may be selected from at least one of, but not limited to, ethylene glycol, diethylene glycol, propylene glycol, dipropylene glycol, butane diol, glycerol, trimethylolpropane, triethanolamine, pentaerythritol and sorbitol.

The first polyether polyol is present in an amount of from 50–65 parts by weight, preferably from 50–60 parts by weight, and more preferably 60 parts by weight, based on the total parts by weight of the first and the second polyether polyols. The second polyether polyol is present in an amount of from 35–50 parts by weight, preferably from 40–50 parts by weight, and more preferably 40 parts by weight, based on the total parts by weight of the first and the second polyether polyols. Those skilled in the art recognize that when the amounts of the first and the second polyether polyols are expressed as a basis of the total weight of the resin composition, instead of the first and the second polyether polyols, the amounts will vary. For example, the amounts will vary if additional components are taken into consideration.

Without intending to be bound by theory, it is believed that the amounts of the first and the second polyether polyols effect the first Tg and the second Tg. More importantly, it is believed that the amounts effect the ratio of the tan delta peaks and thereby the temperature use range of the foam. Therefore, the amounts are selected to optimize the viscoelastic properties of the foam at the broad range of use temperatures. The broadened temperature use range is believed to result from the first and the second polyether polyols phase separating when the foam is formed. Therefore, each of the polyether polyols creates a different soft phase and each soft phase has a different Tg. It is believed that the first polyether polyol corresponds to the second Tg and the second polyether polyol corresponds to the first Tg. The phase separation occurs in the soft segments of the foam and each of the polyether polyols produces a distinct soft segment phase. Those skilled in the art will recognize that the first and the second polyether polyols do not need to phase separate at room temperature to have distinct phase separations within the formed foam.

The subject invention may comprise other polyols in addition to the first and the second polyether polyols described above. These may include polyester polyols or polyamine polyols. The polyester polyols may be obtained by the condensation of appropriate proportions of glycols and higher functionality polyols with polycarboxylic acids. Still further suitable polyols include hydroxyl-terminated polythioethers, polyamides, polyesteramides, polycarbonates, polyacetals, polyolefins and polysiloxanes. Other polyols that may be used include dispersions or solutions of addition or condensation polymers in polyols of the types described above. Such modified polyols, often referred to as polymer polyols, graft polyols, or graft dispersions, have been fully described in the prior art and include products obtained by the in-situ polymerization of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol.

The composition further includes a chain extender (D) having a backbone chain with from two to eight carbon atoms. Preferably, the backbone chain is from two to six carbon atoms. The chain extender (D) also has a weight-average molecular weight of less than 1,000. Preferably, the chain extender (D) has a weight-average molecular weight of from 25 to 250 and more preferably less than 100. The chain extender (D) may be present in an amount of from greater than 0 to 30 parts by weight based on 100 parts by weight of the composition, preferably from 3 to 20, and more preferably 3 to 15.

The chain extender (D) has two isocyanate-reactive groups. Preferably, the chain extender (D) is a diol having hydroxyl groups as the isocyanate-reactive groups. More preferably, the chain extender (D) is selected from at least one of 1,4-butanediol, 1,3-butanediol, 2,3-butanediol, 1,2-butanediol, 1,3-propylene glycol, 1,5-pentanediol, ethylene glycol, diethylene glycol, and polyethylene glycols having a weight-average molecular weight of up to 200. One suitable example of a commercially available chain extender (D) is NIAX® PROCESSING ADDITIVE DP1022 from GE Silicones.

Without intending to be bound by theory, it is believed that the chain extender (D) increases the first Tg of the foam, while having little effect on the second Tg. The chain extender (D) and the isocyanate component (A) react to form urethane hard segments within the foam that are incorporated into the soft segment phase and raise the soft segment first Tg. This allows adjustment of Tg over a wide range of temperatures, independent of a density of the foam, which was not previously possible. The combination of the first (B) and the second (C) polyether polyols and the chain extender (D) levels provide flexibility to produce foams that perform satisfactorily over a wide range of temperatures. Therefore, the levels can be adjusted to perform well at cold temperatures and warmer temperatures; such is the case in many automotive and non-automotive applications. It should be noted that in addition to adjusting the chain extender (D) level, raising the isocyanate index also raises Tg. By simultaneously adjusting the isocyanate index, both the Tg and hardness can be independently varied.

The composition may further include a cross-linker. If included, the cross-linker is present in an amount of from greater than 0 to 18 parts by weight, preferably from 4 to 16 parts by weight, more preferably from 4 to 15 parts by weight, based on 100 parts by weight of the composition. Preferably, the cross-linker is an amine-based cross-linker and even more preferably, the amine-based cross-linker is selected from at least one of triethanolamine, diethanolamine, ethylene diamine alkoxylation products thereof having a hydroxyl number greater than 250 mg KOH/g. However, it is to be appreciated that other types of cross-linkers other than amine-based cross-linkers may be used in the subject invention. A polyol having a hydroxyl number of greater than 250 mg KOH/g and a functionality greater than 2 may also be used as the cross-linker in the subject invention. A suitable cross-linker is, but not limited to, Pluracole® 355, commercially available from BASF Corporation.

A monol may also be included in the composition and, if included, is present in an amount of from 1 to 15 parts by weight based on 100 parts by weight of the composition to increase the tan delta peak of the foam. Preferably, the monol is selected from at least one of benzyl alcohol, 2,2-dimethyl-1,3-dioxolane-4-methanol, and alcohol ethoxylate. Increasing the monol increases peak tan delta of the foam, while also softening the foam and slowing recovery. Examples of suitable monols include, but are not limited to, Solketal, which is commercially available from Chemische Werke Hommel GmbH, ICONOL™ DA-4, ICONOL™ DA-6, MACOL® LA4, PLURAFAC® RA-40, PLURAFAC® LF4030, and INDUSTROL® TFA-8, all of which are commercially available from BASF Corporation.

The composition may also include a cell opener having at least one of a paraffinic, cyclic, and aromatic hydrocarbon chain and, if included, is present in an amount of from greater than 0 to 15 parts by weight based on 100 parts by weight of the composition, preferably from 1 to 12, and more preferably from 3 to 12. Preferably, the cell opener is mineral oil. However, other cell openers may be used which include, but are not limited to, silicone oils, corn oil, palm oil, linseed oil, soybean oil and defoamers based on particulates, such as silica. Foams formed with the cell opener are noticeably less tacky than those without the cell opener and the foams did not have an oily residue. It has been determined that foams containing less than 2.5 parts by weight of the cell opener based on 100 parts by weight of the composition have fewer tendencies to retain fingerprints after handling. However, it is to be appreciated that modifying the other components of the composition may also effect fingerprinting. One example of a suitable cell opener includes, but is not limited to, white, light mineral oil commercially available from Mallinckrodt Chemicals. Those skilled in the art recognize that additional cell openers may be employed with the subject invention. For example, a surfactant may be used that when used with another surfactant increases the openness of the foam. Such suitable cell openers include, but are not limited to, Ortegol® 500 and Ortegol® 501 commercially available from Goldschmidt.

The composition may further include other additives such as surfactants, blowing agents, stabilizers, or catalysts as is known to those skilled in the art. One example of a suitable surfactant is a silicone based surfactant commercially available from GE Silicones as NIAX® SILICONE L-5614. Suitable blowing agents may include physical blowing agents and/or chemical blowing agents. Examples of suitable stabilizers include, but are not limited to, TEGOSTAB® B-8409 and TEGOSTAB® B-8418, both commercially available from Goldschmidt Chemical Corporation. Examples of catalysts include, but are not limited to, DABCO® 33LV or DABCO® BL-11 commercially available from Air Products and Chemicals, Inc.

The subject invention further provides a method of forming a viscoelastic polyurethane foam comprising the steps of providing the isocyanate component (A), providing the first (B) and the second (C) polyether polyols, and providing the chain extender (D). The method further includes the step of reacting the isocyanate component (A), the first (B) and the second (C) polyether polyols, and the chain extender (D) to form the foam having the first Tg greater than zero and the second glass Tg less than zero and having a tan delta peak ratio of the first glass transition temperature to the second glass transition temperature less than 2.2.

EXAMPLES

Viscoelastic polyurethane foams were formed according to the subject invention. Each of the components forming the composition is listed in parts by weight, unless otherwise indicated. As set forth above, the isocyanate index is the ratio of —NCO groups in the isocyanate component (A) to the —OH groups in the first and the second polyether polyols.

TABLE 1

Formulation

| Component | Example 1 | Example 2 | Example 3 | Example 4 | Comparative Example 1 | Comparative Example 2 |
|---|---|---|---|---|---|---|
| First Polyether Polyol | 60.00 | 50.00 | 50.00 | 50.00 | 40.00 | 10.00 |
| Second Polyether Polyol | 40.00 | 50.00 | 50.00 | 50.00 | 60.00 | 90.00 |
| Chain extender | 10.00 | 10.00 | 6.00 | 4.00 | 10.00 | 10.00 |
| Catalyst A | 0.10 | 0.10 | 0.10 | 0.10 | 0.10 | 0.10 |
| Catalyst B | 0.30 | 0.30 | 0.30 | 0.30 | 0.30 | 0.30 |
| Surfactant | 3.00 | 3.00 | 3.00 | 3.00 | 3.00 | 3.00 |
| Water | 2.70 | 2.70 | 2.70 | 2.70 | 2.40 | 2.70 |
| Isocyanate Index | 85 | 85 | 85 | 8.5 | 85 | 85 |

The first polyether polyol has a functionality of about 3, a weight-average molecular weight of about 6000, a hydroxyl number of about 25 mg KOH/g, and 5% EO-95% PO heteric, commercially available from BASF Corporation as PLURACOL® 2100 Polyol. The second polyether polyol has a functionality of about 2.96, a weight-average molecular weight of about 3606, a hydroxyl number of about 46 mg KOH/g, and 75% EO-25% PO heteric, commercially available from BASF Corporation as PLURACOL® 593 Polyol.

The chain extender is a butanediol isomer commercially available from GE Silicones as Niax® PROCESSING ADDITIVE DP1022. Catalyst A is 70% bis-(dimethylaminoethyl) ether in dipropylene glycol and has a hydroxyl number of about 240 mg KOH/g. Catalyst B is 33% triethylenediamine in propylene glycol and has a hydroxyl number of about 561 mg KOH/g. Both catalyst A and catalyst B are commercially available from Air Products and Chemicals, Inc as DABCO® BL-11 and DABCO® 33LV, respectively. The surfactant is a silicone based surfactant, commercially available from GE Silicon as NIAX® SILICONE L-5614.

The isocyanate component includes about 1.1% 2,2'-MDI, about 25.0% 2,4'-MDI, about 62.5% 4,4'-MDI, and 11.4% PMDI, based on the total weight of the isocyanate component. The isocyanate component is commercially available from BASF Corporation as Iso. No. 278.

The foams were prepared by standard hand mix procedures and allowed to cure for several hours before cutting. In the hand mixtures, all components, except isocyanate, were added into a 64-oz. paper cup and pre-blended for 48 seconds using a 3-inch diameter circular German mix blade rotating at 2200 rpm. The isocyanate component was then added, then mixed for 8 seconds. The mixture was then poured into a 5-gallon bucket and allowed to cure for at least 30 minutes at room temperature. The foams were then placed into an oven set at 250° F. for 16 hours. The DMTA was measured in accordance with D4065 using a Rheometrics RSA II and disk-shaped samples 2 cm wide by ½ inch thick were die cut for the measurements. A strain of 0.5%, frequency 1 Hz and heating rate 5° C./min were used.

Referring to FIGS. 1–6, DMTA profiles have been prepared for each of the Examples. The DTMA profile illustrates a storage modulus (E') and a loss modulus (E") for the foam. Tan delta is the ratio of the loss modulus to the storage modulus and is a measure of energy lost to energy recovered. Specifically referring to FIG. 1, the DMTA profile for Example 1 is illustrated. The foam produced from Example 1 has a first Tg at 69.6° C. and a second Tg at −49.1° C. The peak tan delta at the first Tg is 0.388 and the peak tan delta at the second Tg is 0.501. The ratio of the peak tan delta at the first Tg to the peak tan delta at the second Tg is 0.388/0.501, or 0.774. A 4"×4"×2" block of the foam was placed in a freezer at −16° C. for at least two hours. The foam was removed and observed. Foam that passed the freezer test was easily compressed by hand and are considered flexible. Foam that did not pass the freezer test were rigid, cold, and inflexible. Generally, the foam that passed the freezer test had a peak tan delta ratio of less than 2.2 and those that failed the test had a ratio greater than 2.2. The ratio for Example 1 is less than 2.2 and therefore the foam has satisfactory performance at both the first Tg and the second Tg. Such a viscoelastic foam is useable in automotive seating and non-automotive applications that are subjected to wide temperature ranges.

Figure 2:
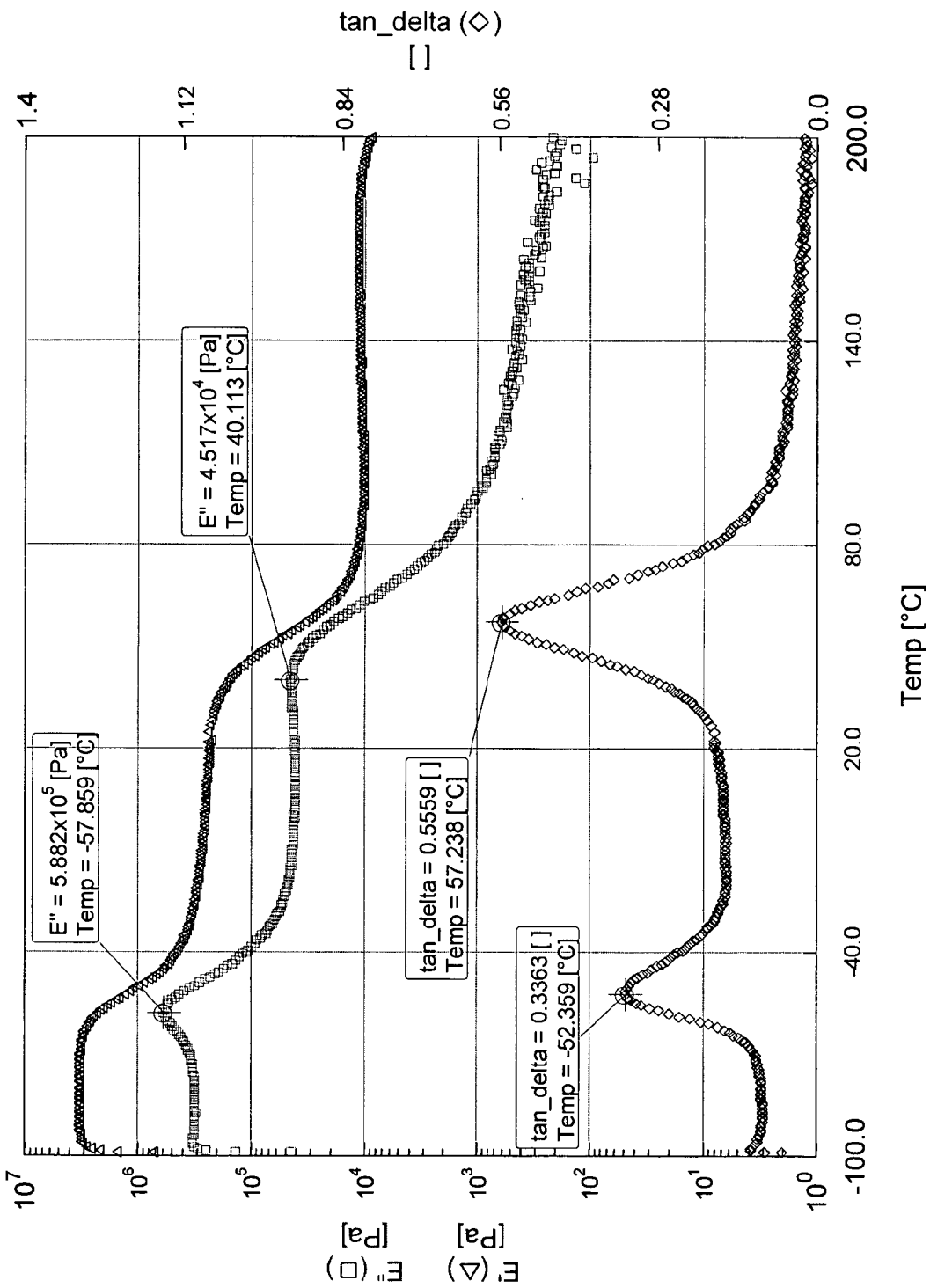
FIG. 2 is a graphical representation illustrating the DMTA profile for the viscoelastic polyurethane foam prepared according to Example 2.

FIG. 2 illustrates the DMTA profile for Example 2. The foam produced from Example 2 has a first Tg at 57.2° C. and a second Tg at −52.4° C. The peak tan delta at the first Tg is 0.556 and the peak tan delta at the second Tg is 0.336. The ratio of the peak tan delta at the first Tg to the peak tan delta at the second Tg is 0.556/0.336, or 1.655. This ratio is less than 2.2 and therefore the foam has satisfactory performance at both the first Tg and the second Tg. Comparing Examples 1 and 2, the ratio of the peak tan delta is effected by the different amounts of the first and the second polyether polyol. Decreasing the first polyether polyol from 60 pbw to 50 pbw and increasing the second polyether polyol from 40 pbw to 50 pbw, increased the ratio from 0.774 to 1.655. One skilled in the art would recognize from such a result that the amounts of the polyether polyols contribute significantly to the satisfactory performance of the foam at both the first Tg and the second Tg.

Figure 3:
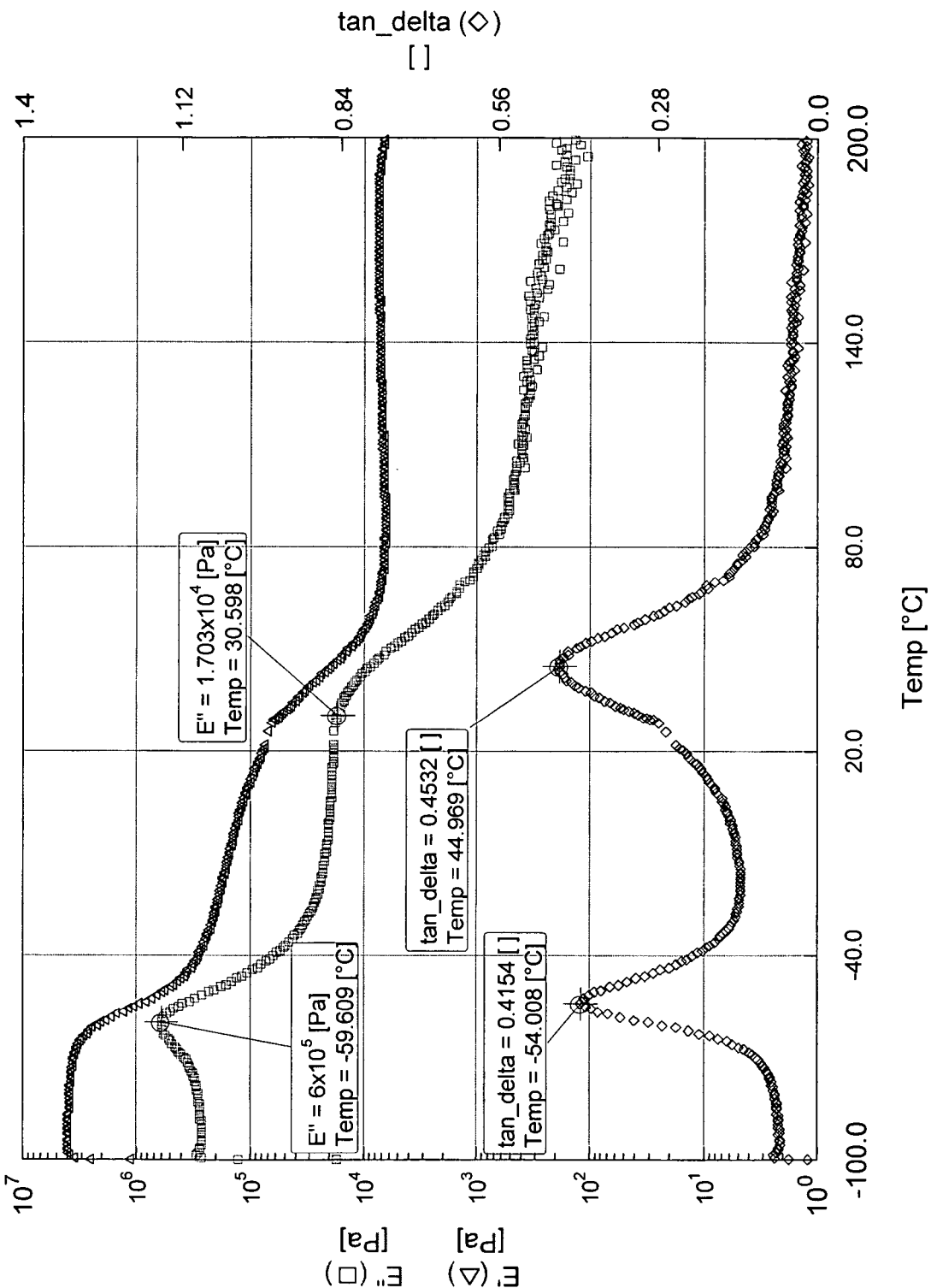
FIG. 3 is a graphical representation illustrating the DMTA profile for the viscoelastic polyurethane foam prepared according to Example 3.

Referring to FIG. 3, the DMTA profile of Example 3 is illustrated. The foam produced from Example 3 has a first Tg at 45.0° C. and a second Tg at −54.0° C. The peak tan delta at the first Tg is 0.453 and the peak tan delta at the second Tg is 0.415. The ratio of the peak tan delta at the first Tg to the peak tan delta at the second Tg is 0.453/0.415, or 1.092. This ratio is less than 2.2 and therefore the foam has satisfactory performance at both the first Tg and the second Tg.

Figure 4:
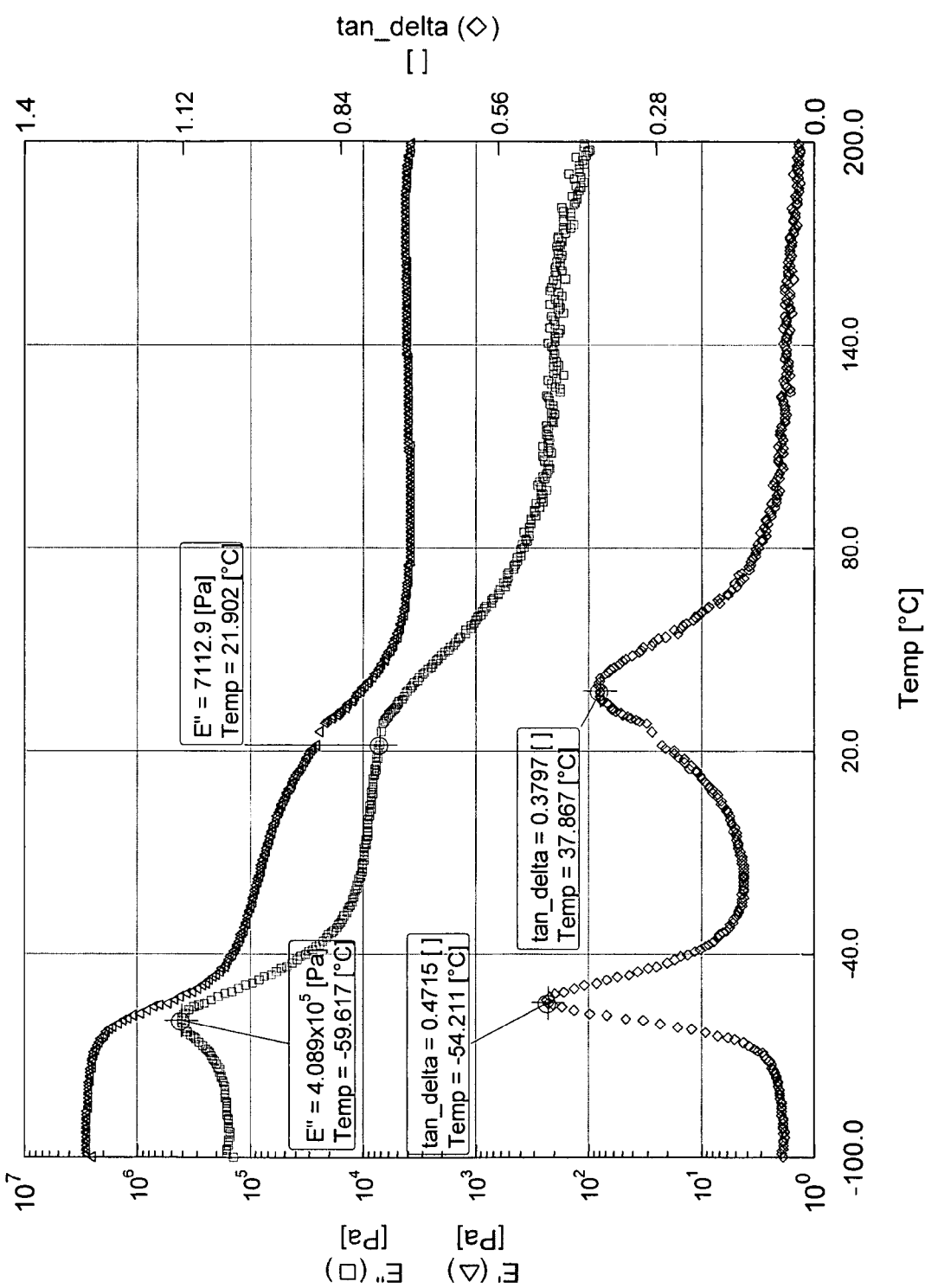
FIG. 4 is a graphical representation illustrating the DMTA profile for the viscoelastic polyurethane foam prepared according to Example 4.

FIG. 4 illustrates the DMTA profile for Example 4 is illustrated. The foam produced from Example 4 has a first Tg at 37.9° C. and a second Tg at −54.2° C. The peak tan delta at the first Tg is 0.380 and the peak tan delta at the second Tg is 0.472. The ratio of the peak tan delta at the first Tg to the peak tan delta at the second Tg is 0.380/0.472, or 0.805. This ratio is less than 2.2 and therefore the foam has satisfactory performance at both the first Tg and the second Tg. Comparing Examples 2–4, the amount of the chain extender has been decreased in each of the successive Examples. In Example 2, the chain extender was present in an amount of 10 pbw, whereas in Example 3, the chain extender was present in an amount of 6 pbw, and in Example 4, the chain extender was present in an amount of 4 pbw. Decreasing the amount of chain extender resulted in the first Tg moving from 57.2° C. in Example 2 to 37.8° C. in Example 4. However, the second Tg underwent only minor changes when the amount of the chain extender was decreased. In Example 2, the second Tg was −52.4° C. and Example 4 had the second Tg of −54.2° C.

Figure 5:
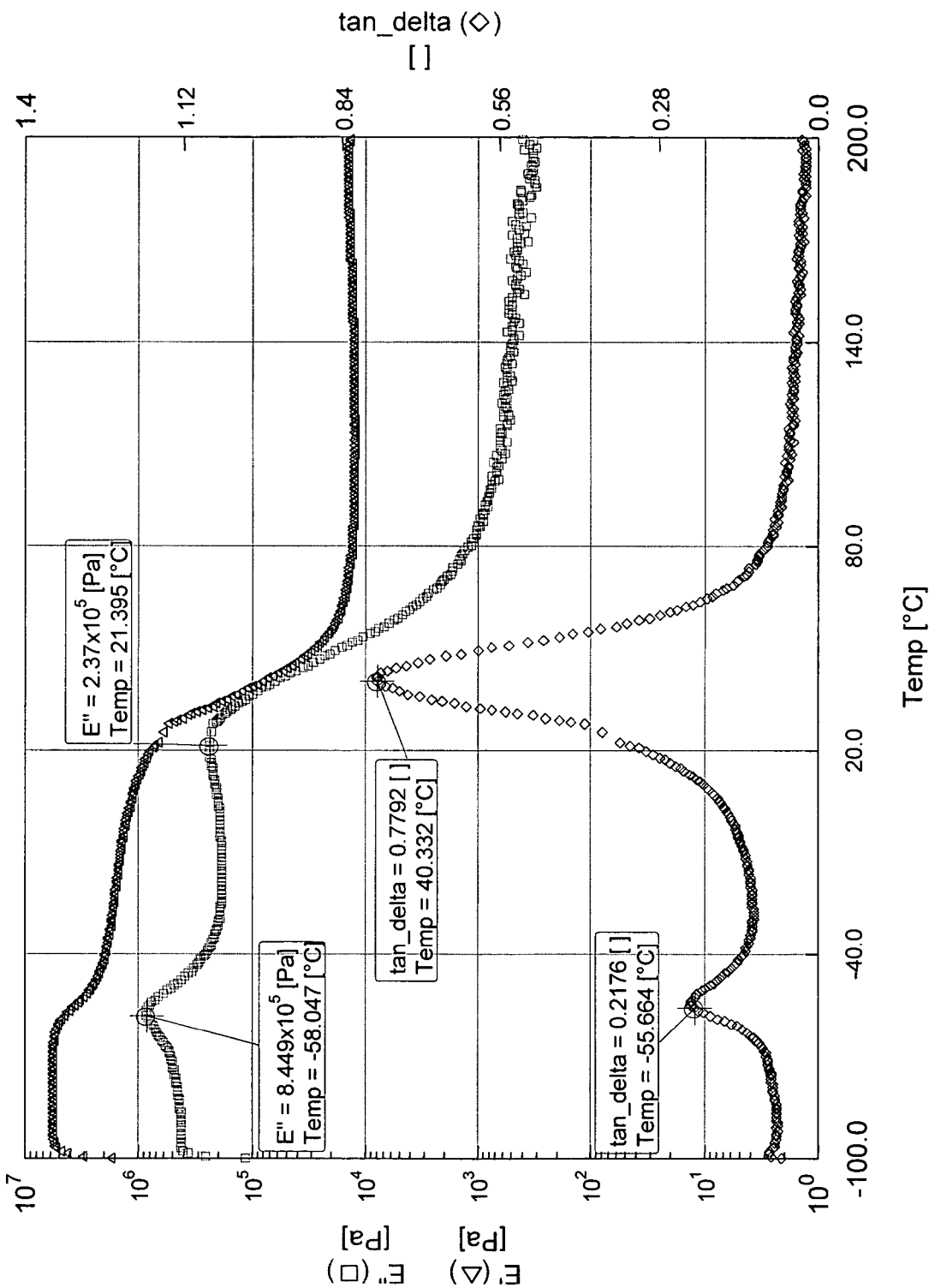
FIG. 5 is a graphical representation illustrating the DMTA profile for the viscoelastic polyurethane foam prepared according to Comparative Example 1.

The DMTA profile for Comparative Example 1 is illustrated in FIG. 5. The foam produced from Comparative Example 1 has a first Tg at 40.3° C. and a second Tg at −55.7° C. The peak tan delta at the first Tg is 0.779 and the peak tan delta at the second Tg is 0.218. The ratio of the peak tan delta at the first Tg to the peak tan delta at the second Tg is 0.779/0.218, or 3.573. This ratio is greater than 2.2 and therefore the foam has unsatisfactory performance at least at one of the first Tg and the second Tg. The foam did not pass the freezer test. Such a viscoelastic foam is not preferred for use in automotive seating applications. Relative to Example 1, the amounts of the first and the second polyether polyols have changed and the result is that the foam of Comparative Example 1 would not perform as well as the foam of Example 1.

Figure 6:
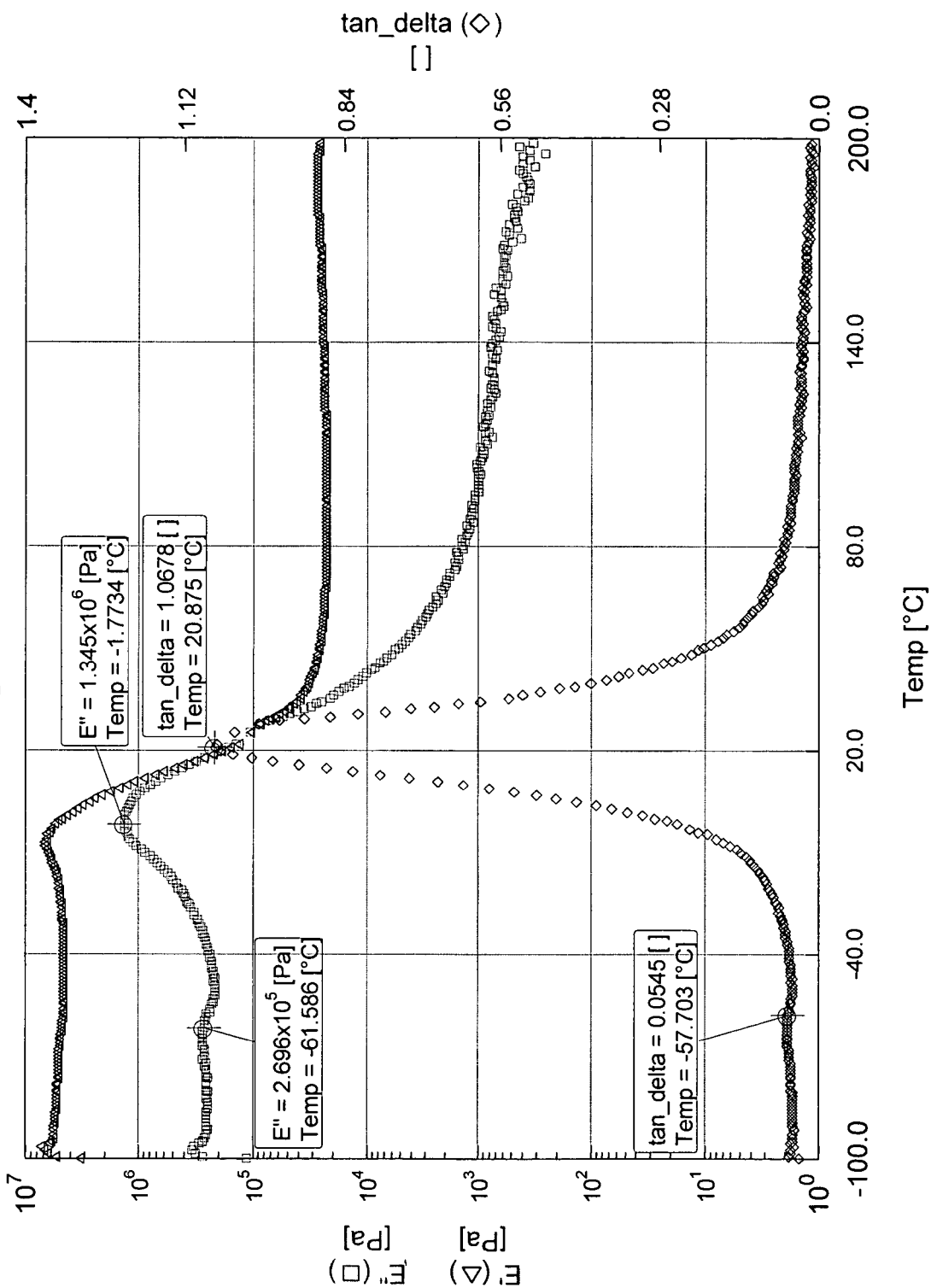
FIG. 6 is a graphical representation illustrating the DMTA profile for the viscoelastic polyurethane foam prepared according to Comparative Example 2.

FIG. 6 illustrates the DMTA profile for Comparative Example 2. The foam produced from Comparative Example 2 has a first Tg at 20.9° C. and a second Tg at −57.7° C. The peak tan delta at the first Tg is 1.068 and the peak tan delta at the second Tg is 0.055. The ratio of the peak tan delta at the first Tg to the peak tan delta at the second Tg is 1.068/0.055, or 19.418. This ratio far exceeds 2.2 and therefore the foam has unsatisfactory performance and did not pass the freezer test.

Additional viscoelastic polyurethane foams were formed from the compositions listed in the table below.

TABLE 2

| | Formulations | |
| Component | Example 5 | Example 6 |
| --- | --- | --- |
| First Polyether Polyol | 60.00 | 60.00 |
| Second Polyether Polyol | 40.00 | 40.00 |
| Chain extender | 6.00 | 9.00 |
| Catalyst A | 0.15 | 0.15 |
| Catalyst B | 0.40 | 0.40 |
| Surfactant | 0.15 | 0.15 |
| Water | 1.50 | 1.50 |
| Isocyanate Index | 87 | 87 |

The first polyether polyol, the second polyether polyol, the chain extender the catalyst A, the catalyst B, the surfactant and the isocyanate component are as described above. The foams were made using an EMB-PUROMAT 80 high pressure urethane metering machine. The mixtures were poured into a cardboard box of dimensions 24×24×14 inches lined with a polyethylene film. Free rise buns approximately 6 inches in height were poured, allowed to cure for at least 30 minutes, then passed twice through a roller crusher. The foams were then post-cured in a convection oven for 16 hours at 250° F. Samples of appropriate dimensions for the required testing were subsequently cut from the free rise buns. Molded blocks were prepared using the same metering equipment and parameters. Foam was poured into a 15×15×4 inch water-jacketed vented aluminum mold. The mold was treated with Chem Trend release agent RCT- B1200 prior to molding each block. A mold surface temperature of 150° F. was maintained and the de-mold time was 10 minutes.

Various physical properties were measured for the foam produced in accordance with the subject invention. Density was measured according to ASTM D1622. Indentation force deflection (IFD) was measured at 25%, 50%, 65%, and 25% Return according to ASTM D3574. Block tear was measured in accordance with ASTM D1938. Tensile strength was determined in accordance with ASTM D3574. Falling ball resilience was measured in accordance with ASTM D3574. Frazier air flow was determined in accordance with ASTM D737. Compression sets were determined in accordance with ASTM D395 and heat aging was determined in accordance with D3574. The resulting physical properties were measured for each of the examples and listed below.

TABLE 3

Physical Properties of Viscoelastic Foam

| Physical Properties | Example 5 | Example 6 | Comparative Example 3 |
|---|---|---|---|
| Density, pcf | 4.29 | 4.18 | 4.29 |
| Tensile, psi | 7.44 | 10.86 | 11.00 |
| HA Tensile, psi | 7.04 | 10.94 | 11.00 |
| Elongation, % | 254.37 | 234.74 | 169.00 |
| Tear strength, pli | 1.70 | 2.10 | 1.30 |
| Resilience, % | 7.00 | 7.00 | 4.00 |
| IFD, lb/50 sq. in. (4 in.) | | | |
| 25% | 11.74 | 14.32 | 15.80 |
| 65% | 29.97 | 37.14 | 39.40 |
| Support Factor | 2.55 | 2.59 | 2.49 |
| Hysteresis, % (75% deflection) | 42.36 | 52.09 | 39.20 |
| 50% Original CFD, lbf | 0.24 | 0.32 | 0.29 |
| 50% Humid Aged CFD, % of original | 78.00 | 80.00 | 92.00 |
| 50% Compression Sets, % set | | | |
| Original | 18.70 | 5.99 | 2.00 |
| Humid Aged (3 hrs at 220° F.) | 30.07 | 23.39 | 3.00 |
| Frazier, cfm/ft2 before fatigue | 4.48 | 8.12 | 2.70 |
| Recovery Time, sec (4 in. IFD) | 17.00 | 22.00 | 11.00 |
| DMA | | | |
| Tg Temp, ° C. | −47.00/19.30 | −47.20/28.80 | 16.00 |
| Peak Tan Delta | 0.40/0.52 | 0.31/0.61 | 1.05 |
| Peak Tan Delta Ratio | 1.33 | 2.00 | N/A |
| Fatigue Properties Pounding, 12k cycles @ 6 sec cycle time | | | |
| Height, % loss | 1.28 | 0.77 | 0 |
| 40% IFD, % Loss | 1.68 | 1.24 | 6.3 |
| Flammability Properties Cal. T.B. 117 | | | |
| Vertical Open Flame | Pass | Pass | Pass |
| Smoldering | Pass | Pass | Pass |

Comparative Example 3 is a commercially available viscoelastic foam. Each of Examples 5 and 6 and Comparative Example 3 have comparable density and hardness. Example 5 is the least temperature-sensitive and is also the softest. Examples 5 and 6 exhibit characteristic slow recovery, although recovery is slightly slower as compared to Comparative Example 3. Each of the above Examples pass the California 117 TB vertical flame and smoldering tests, although Examples 5 and 6 do so without any added flame retardant. Further, Examples 5 and 6 exceed the performance of Comparative Example 3 in the pounding test.

Examples 5 and 6 each have two glass transitions, one at around or just above room temperature, and the other at −50° C. The glass transition around room temperature provides the desired slow recovery and feel to the foam, while the low temperature glass transition prevents the foam from becoming rigid at low temperature. In essence, the two glass transitions represent "pressure relief" and "temperature relief". Whereas, Comparative Example 3 has only the glass transition around room temperature.

Obviously, many modifications and variations of the present invention are possible in light of the above teachings. The invention may be practiced otherwise than as specifically described within the scope of the appended claims.

What is claimed is:

1. A viscoelastic polyurethane foam comprising a reaction product of:
   (A) an isocyanate component;
   (B) a first polyether polyol having;
      (i) a hydroxyl number of from 20 to 60 mg KOH/g,
      (ii) a plurality of internal blocks formed from oxyalkylene monomers comprising a random heteric mixture of ethylene oxide and propylene oxide with said internal blocks having at most 20% by weight ethylene oxide based on a total weight of said oxyalkylene monomers in said internal blocks, and
      (iii) a plurality of terminal caps attached to said plurality of internal blocks and comprising at most 25% by weight ethylene oxide based on a total weight of said first polyether polyol;
   (C) a second polyether polyol having;
      (i) a hydroxyl number of from 20 to 200 mg KOH/g,
      (ii) a plurality of internal blocks formed from oxyalkylene monomers,
      (iii) a plurality of terminal caps attached to said plurality of internal blocks, and
      (iv) at least 50% by weight ethylene oxide based on the total weight of the second polyether polyol;
   wherein said first polyether polyol (B) is reacted in an amount of from 50 to 65% by weight, and said second polyether polyol (C) is reacted in an amount of from 35 to 50% by weight, both based on the total weight of the first and the second polyether polyols;
   (D) a chain extender present in an amount of from 3 to 20 parts by weight based on the total weight of (A), (B), (C), and (D) and having;
      (i) a backbone chain with from two to eight carbon atoms, and
      (ii) a weight-average molecular weight of from 25 to 250; and
   said foam having a density of from 1 to 20 pounds per cubic foot and having a first glass transition temperature greater than zero degrees Celsius and a second glass transition temperature less than zero degrees Celsius and having a tan delta peak ratio of said first glass transition temperature to said second glass transition temperature less than 2.2.

2. A viscoelastic polyurethane foam as set forth in claim 1 wherein said terminal caps of said second polyether polyol (C) comprise at least 30% by weight ethylene oxide based on the total weight of said second polyether polyol (C).

3. A viscoelastic polyurethane foam as set forth in claim 1 wherein said second polyether polyol (C) comprises at least 60% by weight ethylene oxide based on the total weight of the second polyether polyol (C).

4. A viscoelastic polyurethane foam as set forth in claim 1 wherein said first polyether polyol (B) has a hydroxyl number of from 20 to 30 mg KOH/g.

5. A viscoelastic polyurethane foam as set forth in claim 1 wherein said first polyether polyol (B) comprises at most 13% by weight ethylene oxide based on the total weight of said oxyalkylene monomers in said internal blocks.

6. A viscoelastic polyurethane foam as set forth in claim 1 wherein said terminal caps of said first polyether polyol (B) comprise at most 20% by weight ethylene oxide based on the total weight of said first polyether polyol (B).

7. A viscoelastic polyurethane foam as set forth in claim 1 wherein said first glass transition temperature is further defined as from 15 to 70° C.

8. A viscoelastic polyurethane foam as set forth in claim 7 wherein said second glass transition temperature is further defined as from −40 to −60° C.

9. A viscoelastic polyurethane foam as set forth in claim 1 having a density of from 1.8 to 10 pounds per cubic foot.

10. A viscoelastic polyurethane foam as set forth in claim 1 wherein said chain extender (D) has a weight-average molecular weight of less than 100.

11. A viscoelastic polyurethane foam as set forth in claim 1 wherein said chain extender (D) has two isocyanate-reactive groups.

12. A viscoelastic polyurethane foam as set forth in claim 11 wherein said chain extender (D) is selected from at least one of 1,4-butanediol, 1,3-butanediol, 2,3-butanediol, 1,2-butanediol, 1,3-propylene glycol, 1,5-pentanediol, ethylene glycol, diethylene glycol, and polyethylene glycols having a weight-average molecular weight of up to 200.

13. A viscoelastic polyurethane foam as set forth in claim 1 wherein said isocyanate component (A) is further defined as an isocyanate-terminated prepolymer.

14. A viscoelastic polyurethane foam as set forth in claim 13 wherein said prepolymer comprises a reaction product of an isocyanate and a prepolymer polyol having a weight-average molecular weight greater than 1,000, said prepolymer polyol being used in an amount of from 1 to 20 parts by weight based on 100 parts by weight of said isocyanate component (A).

15. A composition for use in forming a viscoelastic polyurethane foam having a density of from 1 to 20 pounds per cubic foot, said composition comprising:
   (A) an isocyanate component;
   (B) a first polyether polyol having;
      (i) a hydroxyl number of from 20 to 60 mg KOH/g,
      (ii) a plurality of internal blocks formed from oxyalkylene monomers comprising a random heteric mixture of ethylene oxide and propylene oxide with said internal blocks having at most 20% by weight ethylene oxide based on a total weight of said oxyalkylene monomers in said internal blocks,
      (iii) a plurality of terminal caps attached to said plurality of internal blocks and comprising at most 25% by weight ethylene oxide based on a total weight of said first polyether polyol;
   (C) a second polyether polyol having;
      (i) a hydroxyl number of from 20 to 200 mg KOH/g,
      (ii) a plurality of internal blocks formed from oxyalkylene monomers,
      (iii) a plurality of terminal caps attached to said plurality of internal blocks,
      (iv) at least 50% by weight ethylene oxide based on the total weight of the second polyether polyol (C);
   (D) a chain extender having;
      (i) a backbone chain with from two to eight carbon atoms,
      (ii) a weight-average molecular weight of from 25 to 250, and wherein said chain extender is present in an amount of from 3 to 20 parts by weight based on 100 parts by weight of said composition and wherein said first polyether polyol (B) is present in an amount of from 50 to 65% by weight, and said second polyether polyol (C) is present in an amount of from 35 to 50% by weight, both based on the total weight of the first and the second polyether polyols to produce the viscoelastic polyurethane foam having a first glass transition temperature greater than zero degrees Celsius and a second glass transition temperature less than zero degrees Celsius.

16. A composition as set forth in claim 15 wherein said terminal caps of said second polyether polyol (C) comprise at least 30% by weight ethylene oxide based on the total weight of said second polyether polyol (C).

17. A composition as set forth in claim 15 wherein said second polyether polyol (C) comprises at least 60% by weight ethylene oxide based on the total weight of the second polyether polyol (C).

18. A composition as set forth in claim 15 wherein said first polyether polyol (B) has a hydroxyl number of from 20 to 30 mg KOH/g.

19. A composition as set forth in claim 15 wherein said first polyether polyol (B) comprises at most 13% by weight ethylene oxide based on the total weight of said oxyalkylene monomers in said internal blocks.

20. A composition as set forth in claim 15 wherein said terminal caps of said first polyether polyol (B) comprises at most 20% by weight ethylene oxide based on the total weight of said first polyether polyol (B).

21. A composition as set forth in claim 15 wherein said isocyanate component (A) has an isocyanate index of from 75 to 100.

22. A composition as set forth in claim 15 wherein said isocyanate component (A) has an isocyanate index of from 75 to 90.

23. A composition as set forth in claim 15 wherein said chain extender (D) has a weight-average molecular weight of less than 100.

24. A composition as set forth in claim 15 wherein said chain extender (D) is selected from at least one of 1,4-butanediol, 1,3-butanediol, 2,3-butanediol, 1,2-butanediol, 1,3-propylene glycol, 1,5-pentanediol, and ethylene glycol, diethylene glycol, and polyethylene glycols having a weight-average molecular weight of up to 200.

25. A composition as set forth in claim 15 wherein said isocyanate component (A) comprises an isocyanate-terminated prepolymer.

26. A composition as set forth in claim 25 wherein said prepolymer comprises a reaction product of an isocyanate and a prepolymer polyol having a weight-average molecular weight greater than 1,000, said polyol present in an amount of from 1 to 20 parts by weight based on 100 parts by weight of said isocyanate component (A).

27. A method of forming a viscoelastic polyurethane foam comprising the steps of:
   providing an isocyanate component (A);
   providing a first polyether polyol (B) having;
      (i) a hydroxyl number of from 20 to 60 mg KOH/g,
      (ii) a plurality of internal blocks formed from oxyalkylene monomers comprising a random heteric mixture of ethylene oxide and propylene oxide with the internal blocks having at most 20% by weight ethylene oxide based on a total weight of the oxyalkylene monomers in the internal blocks,
- (iii) a plurality of terminal caps attached to the plurality of internal blocks and comprising at most 25% by weight ethylene oxide based on the total weight of the first polyether polyol (B);

providing a second polyether polyol (C) having;
- (i) a hydroxyl number of from 20 to 200 mg KOH/g,
- (ii) a plurality of internal blocks formed from oxyalkylene monomers,
- (iii) a plurality of terminal caps attached to the plurality of internal blocks,
- (iv) at least 50% by weight ethylene oxide based on the total weight of the second polyether polyol (C);

wherein the first polyether polyol (B) is provided in an amount of from 50 to 65% by weight, and the second polyether polyol (C) is provided in an amount of from 35 to 50% by weight, both based on the total weight of the first and the second polyether polyols;

providing a chain extender (D) having;
- (i) a backbone chain with from two to eight carbon atoms,
- (ii) a weight-average molecular weight of from 25 to 250, wherein the chain extender (D) is used in an amount of from 3 to 20 parts by weight based on 100 parts by weight of the foam; and reacting the isocyanate component (A), the first (B) and the second (C) polyether polyols, and the chain extender (D) to form the foam having a density of from 1 to 20 pounds per cubic foot and having a first glass transition temperature greater than zero degrees Celsius and a second glass transition temperature less than zero degrees Celsius and having a tan delta peak ratio of the first glass transition temperature to the second glass transition temperature less than 2.2.

28. A method as set forth in claim 27 wherein the second polyether polyol (C) has the terminal caps comprising at least 30% by weight ethylene oxide based on the total weight of the second polyether polyol (C).

29. A method as set forth in claim 27 wherein the second polyether polyol (C) comprises at least 60% by weight ethylene oxide based on the total weight of the second polyether polyol (C).

30. A method as set forth in claim 27 wherein the first polyether polyol (B) has a hydroxyl number of from 20 to 30 mg KOH/g.

31. A method as set forth in claim 27 wherein the first polyether polyol (B) comprises at most 13% by weight ethylene oxide based on the total weight of the oxyalkylene monomers in the internal blocks.

32. A method as set forth in claim 27 wherein the terminal caps of the first polyether polyol (B) comprises at most 20% by weight ethylene oxide based on the total weight of the first polyether polyol (B).

33. A method as set forth in claim 27 wherein said chain extender (D) has a weight-average molecular weight of less than 100.

34. A method as set forth in claim 27 wherein said chain extender (D) is selected from at least one of 1,4-butanediol, 1,3-butanediol, 2,3-butanediol, 1,2-butanediol, 1,3-propylene glycol, 1,5-pentanediol, and ethylene glycol, diethylene glycol, and polyethylene glycols having a weight-average molecular weight of up to 200.

35. A method as set forth in claim 27 wherein the first glass transition temperature is further defined as from 15 to 70° C.

36. A method as set forth in claim 35 wherein the second glass transition temperature is further defined as from −40 to −60° C.

37. A method as set forth in claim 27 further comprising the step of spraying the isocyanate component (A), the first (B) and the second (C) polyether polyols, and the chain extender (D) into a mold to form the viscoelastic polyurethane foam.

* * * * *